(12) United States Patent
Garfinkle et al.

(10) Patent No.: US 7,093,260 B1
(45) Date of Patent: Aug. 15, 2006

(54) METHOD, SYSTEM, AND PROGRAM FOR SAVING A STATE OF A TASK AND EXECUTING THE TASK BY A PROCESSOR IN A MULTIPROCESSOR SYSTEM

(75) Inventors: Scott Garfinkle, Austin, TX (US); William Henry Hartner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,823

(22) Filed: May 4, 2000

(51) Int. Cl.
*G06F 9/48* (2006.01)
(52) U.S. Cl. ...................... 718/108; 718/102
(58) Field of Classification Search ............. 709/100, 709/101; 718/100–108; 714/48–51
See application file for complete search history.

(56) References Cited

U.S. PATENT DOCUMENTS

| | | | |
|---|---|---|---|
| 4,047,161 A | | 9/1977 | Davis |
| 4,851,992 A | * | 7/1989 | Nakayama .................. 718/108 |
| 5,161,226 A | | 11/1992 | Wainer |
| 5,280,616 A | | 1/1994 | Butler et al. |
| 5,339,425 A | | 8/1994 | Vanderah et al. |
| 5,408,671 A | | 4/1995 | Tanaka |
| 5,414,856 A | * | 5/1995 | Yokota ....................... 710/240 |
| 5,418,913 A | * | 5/1995 | Fujimoto .................... 709/213 |
| 5,428,779 A | * | 6/1995 | Allegrucci et al. ......... 718/108 |
| 5,440,689 A | * | 8/1995 | Reilly et al. ................ 709/216 |
| 5,640,582 A | | 6/1997 | Hays et al. |
| 5,948,093 A | | 9/1999 | Swanstrom et al. |
| 6,145,049 A | * | 11/2000 | Wong ......................... 710/267 |
| 6,209,085 B1 | * | 3/2001 | Hammond et al. ......... 712/244 |
| 6,247,117 B1 | * | 6/2001 | Juffa .......................... 712/222 |
| 6,341,347 B1 | * | 1/2002 | Joy et al. .................... 712/228 |
| 2001/0052065 A1 | * | 12/2001 | Alexander, III et al. .... 712/228 |
| 2004/0088711 A1 | * | 5/2004 | Alverson et al. ........... 718/107 |

FOREIGN PATENT DOCUMENTS

| | | |
|---|---|---|
| JP | 01-073452 | 3/1989 |
| JP | 02-028840 | 1/1990 |
| JP | 03-040139 | 2/1991 |
| JP | 03184127 A * | 8/1991 |
| JP | 03231334 A * | 10/1991 |
| JP | 03-292527 | 12/1991 |
| JP | 09134293 A * | 5/1997 |

OTHER PUBLICATIONS

IBM Technical Disclosure Bulletin, Beetcher et al., "Deterministic Context Switching of Registers", vol. 32, No. 6B, Nov. 1989, pp. 70-73.

* cited by examiner

*Primary Examiner*—Lewis A. Bullock, Jr.
(74) *Attorney, Agent, or Firm*—Marilyn Smith Dawkins Dillon & Yudell LLP

(57) ABSTRACT

A method, system, and program product for saving a state of a task and executing the task by processors such that following the termination of execution of the first task in a first processor, at least a portion of a state of the first task is maintained in registers of the first processor until the first processor executes a second task. Prior to executing the first task on the second processor, a determination is made as to whether the state of the first task is at least partially stored in the registers of another processor, such as the first processor. If the state of the first task is at least partially stored in the registers of the first processor, then contents of said registers in the first processor are stored into a memory system. Thereafter, the first task is executed in the second processor.

22 Claims, 4 Drawing Sheets

METHOD, SYSTEM, AND PROGRAM FOR SAVING A STATE OF A TASK AND EXECUTING THE TASK BY A PROCESSOR IN A MULTIPROCESSOR SYSTEM

BACKGROUND OF THE INVENTION

1. Technical Field

The present invention relates in general to a multiprocessor data processing system, and in particular to a method, system, and program for saving a state of a task by a processor in a multiprocessor system. Still more particularly, the present invention relates to a method, system, and program for selecting and executing the task by the processor in the multiprocessor system.

2. Description of the Related Art

A data processing system may be a multiprocessor system having a plurality of processors. Each processor has a number of register sets. These register sets may be, for example, general purpose registers or floating point registers.

Generally, when a processor in a multiprocessor system finishes a last task and is switching to execute a next task, the state of the last task must be saved into a memory system by saving the states of all of the register sets and all other volatile data for the processor into the memory system. Generally, a state of a task is defined by all of the contents of the registers and all other volatile data for the processor that is executing the task. This save operation is performed for all of the register sets, including registers that may only be occasionally or rarely accessed for some tasks, such as the floating point registers. A considerable amount of overhead and processing time may be required for saving and setting the states for these registers that are only occasionally or rarely accessed by tasks of various application programs. Performing save operations for these registers in instances in which these registers are not even used is extremely wasteful of the processing time of the processor.

For example, in an Intel-based multiprocessor system, the state of the floating point registers for a running thread or task execution must be saved when a task switch is made. Similarly, in a multiprocessor system running under OS/2, save operations are performed on the floating point registers every time a task switch occurs for a processor in the multiprocessor system. Saving and restoring these floating point registers involves a considerable amount of overhead. However, most application programs do not use the floating point registers. Thus, the present invention recognizes that saving floating point registers, especially for the task switches in the applications that do not use the floating point registers, is extremely inefficient. Improvements in efficiency for saving these registers in a uni-processor system have been made, but the present invention recognizes the need to improve the efficiency for saving these registers in a multiprocessor system. In improving the efficiency of saving these registers, the present invention also recognizes the need to continually improve the efficiency of executing a task by a processor within the multiprocessor system.

SUMMARY OF THE INVENTION

A method, system, and program for saving a state of a task and executing the task by a processor in a multiprocessor system having at least first and second processors are disclosed. A first task has been executed in a first processor. A first task is to be executed in a second processor. If a state of the first task is at least partially stored in registers of the second processor, then the method, system, and program proceeds directly to executing the first task in the second processor. Otherwise, following termination of execution of the first task in a first processor, at least a portion of a state of the first task is maintained in registers of the first processor until the first processor executes a second task. Prior to executing the first task on the second processor, a determination is made as to whether the state of the first task is at least partially stored in the registers of another processor, such as the first processor. If the state of the first task is at least partially stored in the registers of the first processor, then contents of said registers in the first processor are stored into a memory system. Thereafter, the first task is executed in the second processor. The registers of the first and second processors include respective exceptional register sets, which may be floating point register sets, general purpose register sets, or other register sets that are only rarely or occasionally used.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention defines any register set that may only be occasionally or rarely accessed by tasks of various application programs as "exceptional register sets". The exceptional register sets may, for example, include floating point registers or general purpose registers. A "state" of a task is defined by all of the contents of the registers and all other volatile data for one of the processors within a multiprocessor system that is executing the task. The present invention modifies the operation of saving the state of a task, such as a last task that a processor in a multiprocessor system has finished executing, by saving contents of all registers except for any exceptional register set into a memory system and by also saving other volatile data in the processor into the memory system. The contents of all register sets except the exceptional register sets are saved into a memory system every time a last task finishes and a next task is to be executed by a processor. The contents of the exceptional register sets are saved into the memory system by the processor only when certain conditions occur. A considerable amount of overhead and processing time may be saved and increased processing efficiency may result by only saving and setting the contents for the exceptional register sets only under certain conditions. The present invention relates to saving a state of a task and selecting and executing the task by a processor in a multiprocessor system based on whether the processor or at least another processor in the multiprocessor system already has in its registers a portion of the state of the task.

Figure 1:
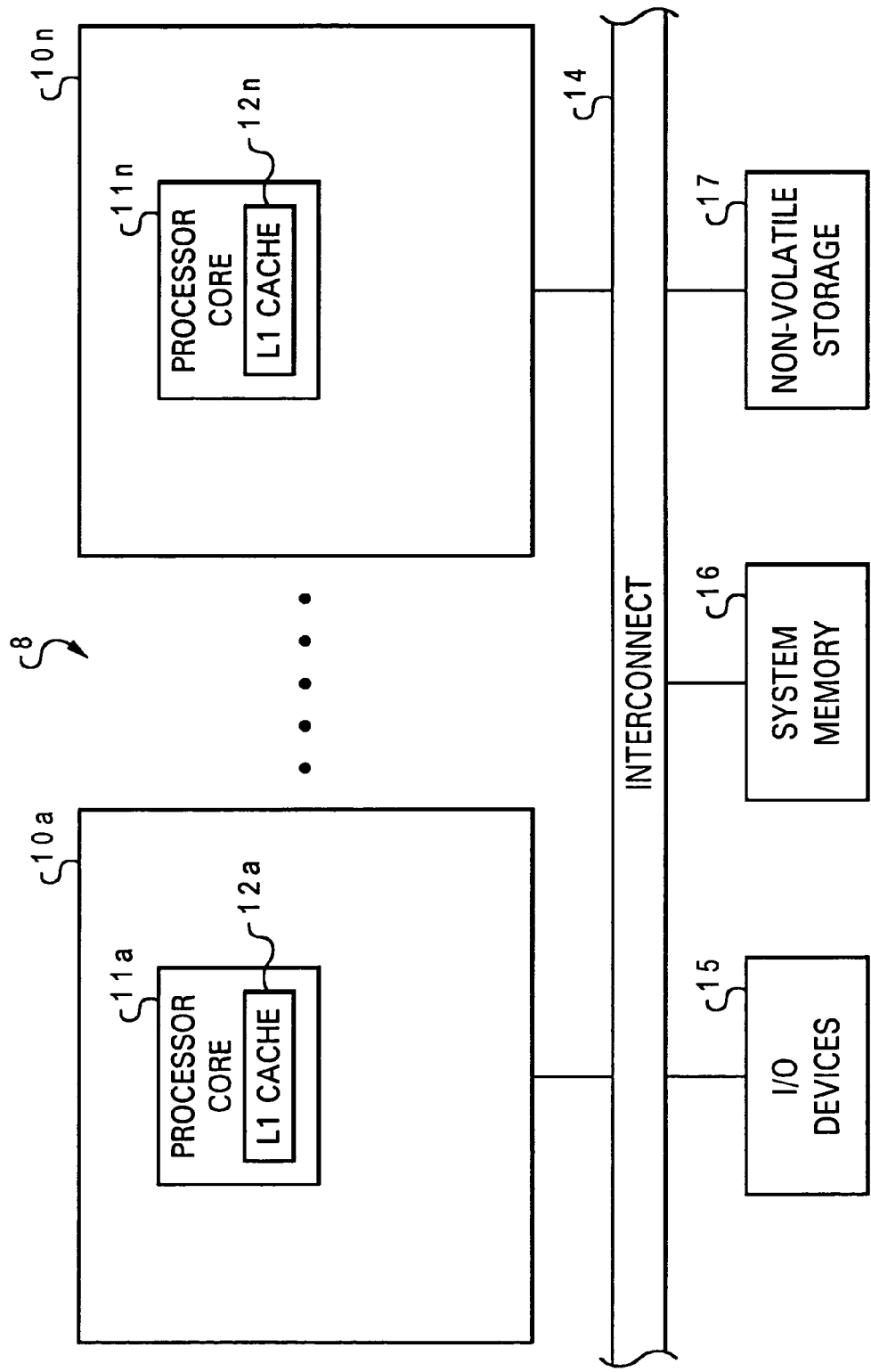
FIG. 1 is a high level block diagram of an exemplary multiprocessor system in which a method, system, and program for saving and setting an exceptional register set and for preferentially selecting and executing a next task by a processor within the multiprocessor system may be advantageously utilized.

With reference now to the figures and in particular with reference to FIG. 1, there is depicted a high level block diagram of an illustrative embodiment of a multiprocessor data processing system 8 with which the present invention may advantageously be utilized. The illustrative embodiment depicted in FIG. 1 can be realized as a workstation computer system such as the RS/6000 or as a server computer system such as the Netfinity, which are both manufactured by International Business Machines (IBM) Corporation of Armonk, N.Y. However, as will become apparent from the following description, the present invention is also applicable to any other data processing system.

As illustrated in FIG. 1, multiprocessor data processing system 8 includes two or more system processors 10a . . . 10n, which are each coupled to system processor bus 14. Each of the system processors 10a . . . 10n is a general-purpose processor (e.g., an Intel Pentium III) that typically processes data under the control of operating system and application software stored in memory system 16. Each of the system processor 10a . . . 10n has a respective processor core 11a . . . 11n. Each processor core 11a . . . 11n has at least a respective L1 cache memory 12a . . . 12n. System processors 10a . . . 10n are coupled via system processor bus 14 to input/output (IO) devices 15, memory system 16, and non-volatile storage 17.

Figure 2:
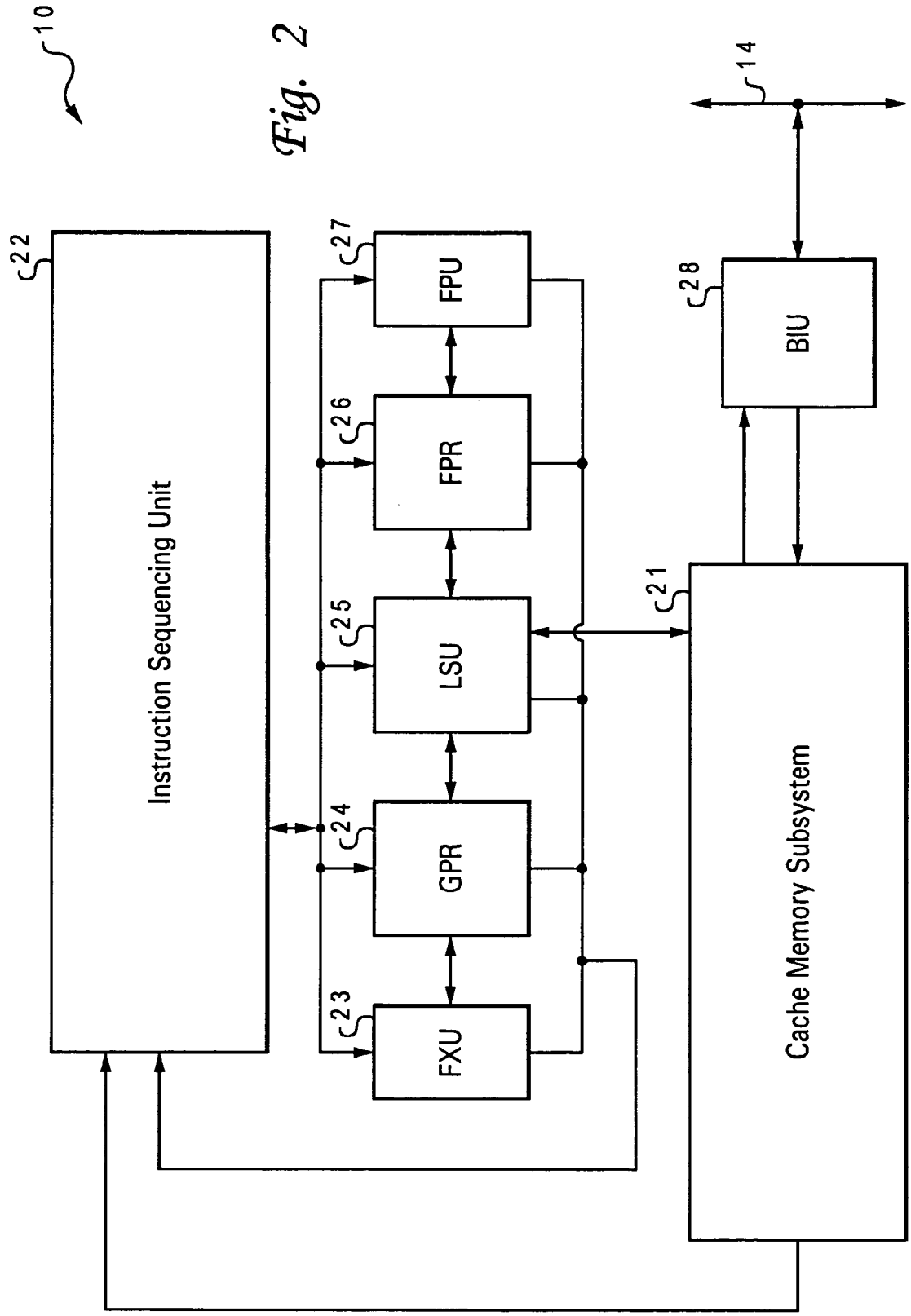
FIG. 2 is a high level block diagram of an exemplary processor within the multiprocessor system of FIG. 1.

Referring now to FIG. 2, there is depicted a high level block diagram of an exemplary system processor 10, which may be any of the system processors 10a . . . 10n, within data processing system 8 of FIG. 1. As illustrated, system processor 10 is coupled to system processor bus 14 via a bus interface unit (BIU) 28. BIU 28 controls the transfer of information between system processor 10 and other devices coupled to system processor bus 14. BIU 28 is also connected to cache memory subsystem 21, which provides low latency storage for a subset of data and instructions previously transferred from memory system 16. Cache memory subsystem 21 is also coupled to instruction sequencing unit 22. Instruction sequencing unit 22 fetches instructions from cache memory subsystem 21 during each cycle.

Branch-type instructions fetched from cache memory subsystem 21 are processed internally by instruction sequencing unit 22; sequential instructions, on the other hand, are dispatched by instruction sequencing unit 22 to execution units (i.e., FXU 23, LSU 25, and FPU 27) for execution. Operands required for instruction execution as well as data resulting from instruction execution may be stored within register sets. These register sets include, for example, general purpose registers (GPR) 24 and floating point registers (FPR) 26. Registers within the register sets are both read-accessible and write-accessible by software. The register sets preferably contain a plurality of registers for storing operands and result data, and these registers may be grouped into multiple separately addressable subsets based upon the types of operand and result data they store.

For exemplary purposes in illustrating the present invention, FPR 26 will be defined as an exceptional register set in accordance with the present invention while all other register sets will be used in the normal way. However, the present invention is not limited to FPRs being defined as exceptional register sets, and any suitable register, such as general purpose registers, condition code registers, etc., may be defined as an exceptional register set so long as the register set is only occasionally or rarely used by various tasks.

Figure 3:
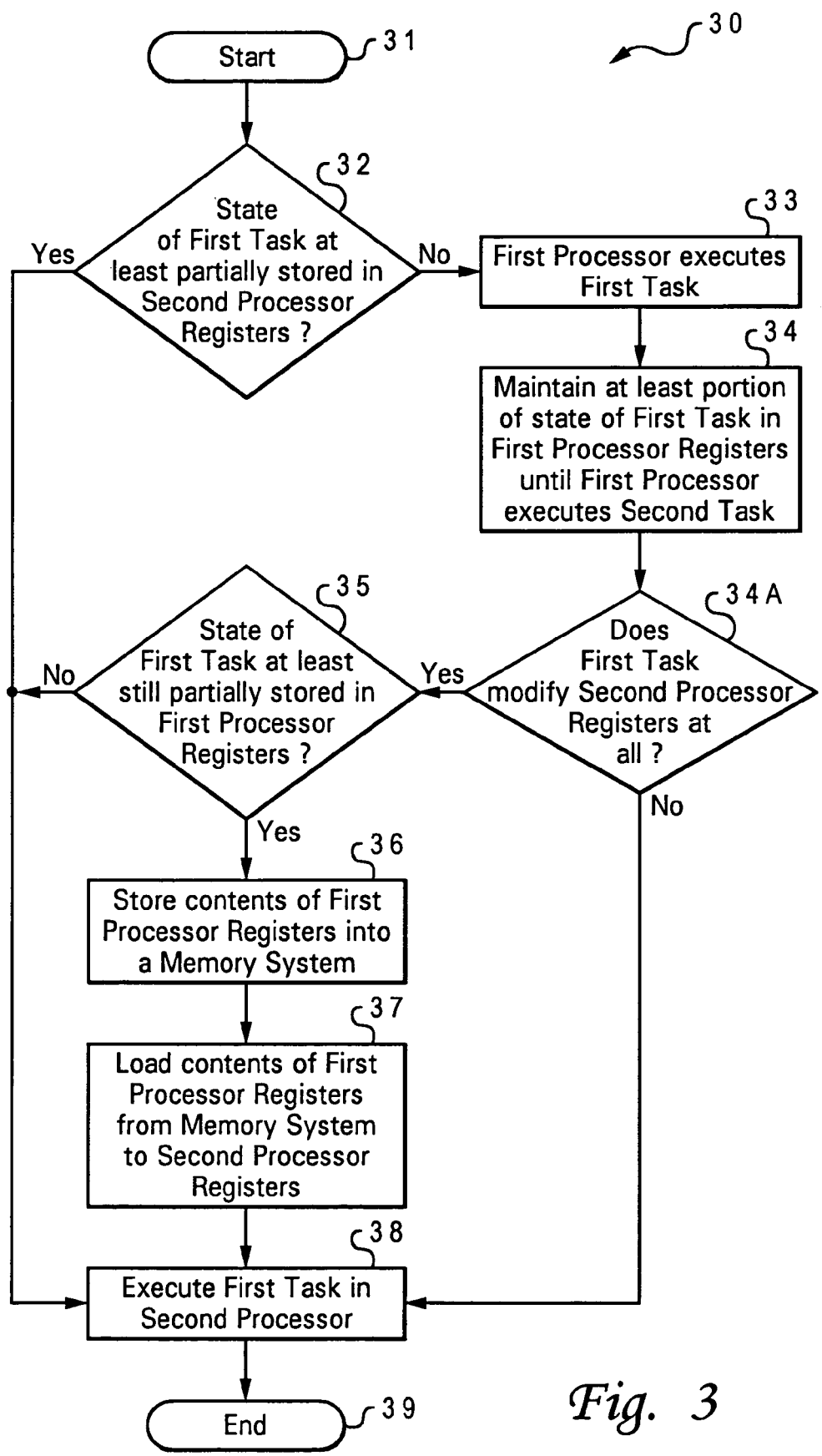
FIG. 3 is a high level logical flow chart of a method and program function for saving a state of a task and selecting and executing the task among various tasks by a processor within a multiprocessor system in accordance with the present invention.

With reference now to FIG. 3, there is depicted a high level logical flow chart of a method 30 and program function for saving a state of a task, such as a first task, and selecting and executing the task among various tasks by a second processor 10b within a multiprocessor system 8 in accordance with the present invention. Since each processor 10a . . . 10n within multiprocessor data processing system 8 processes data under the control of an operating system, method 30 is preferably programmed as operating system code and implemented as part of the operating system scheduler for the operating system. Furthermore, method 30 is an exemplary process that references processors 10a and 10b. The present invention is not limited to being used with these processors, and any suitable processor may be utilized in the present invention.

Method 30 starts at block 31 and moves to decision block 32. Decision block 32 depicts a determination whether a state of a first task is at least partially stored in registers of a second processor 10b. If the state of the first task is at least partially stored in registers of second processor 10b, then method 30 directly proceeds to block 38, which shows that the first task is executed by second processor 10b, and method 30 ends thereafter at block 39. Thus, the task to be executed by second processor 10b is preferentially selected as the first task based on whether the state of the task is at least partially stored in the registers of second processor 10b, which include at least the exceptional register sets for second processor 10b.

However, if the state of the first task is not stored in registers of second processor 10b, then method 30 next moves from decision block 32 to block 33. Block 33 shows that, in exemplary method 30, first processor 10a executes the first task. Following block 33, block 34 shows that at least a portion of the state of the first task in the registers, which include the exceptional register sets, are maintained until first processor 10a executes a second task that modifies the registers of first processor 10a. Method 30 then proceeds to decision block 34A, which shows a determination whether the first task modifies the registers of second processor 10b. If the registers of second processor 10b are not at all modified by the first task, then method 30 moves directly to block 38. However, if the registers of second processor 10b are modified by the first task, then method 30 moves to decision block 35. Since contents of registers may change over time, method 30 then proceeds to decision block 35, which depicts a determination whether the state of the first task is still at least partially stored in the registers of first processor 10a. If the state of the first task is no longer at least partially stored and maintained in the registers of first processor 10a, then method 30 directly moves to block 38, which shows the first task being executed in second processor 10b. On the other hand, if the first task is still at least partially stored and maintained in the registers of first processor 10a, then the task to be executed by second processor 10b is preferentially selected as the first task based on this factor, and method 30 moves from decision block 35 to block 36.

The determinations depicted at decision blocks 32 and 35 can be made, for example, by looking up the information in a data structure in memory system 16 that is updated every time tasks are executed by processors 10a . . . 10n that modify their registers.

Figure 4A:
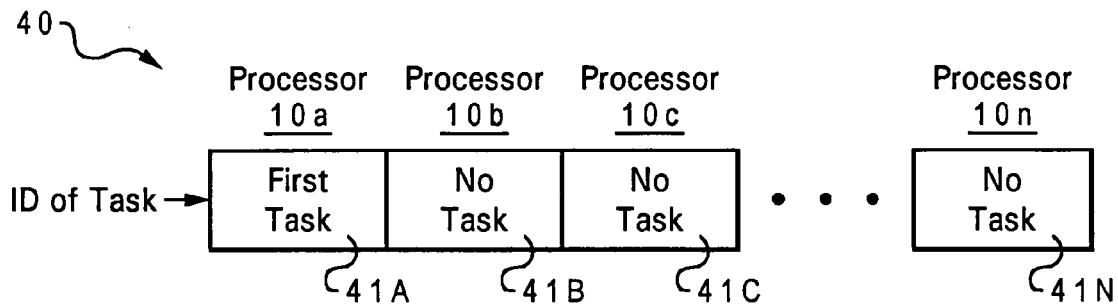
FIGS. 4A to 4C are block diagrams of arrays that store the tasks of various processors for which their registers are currently maintained shown at three different times.

Referring now to FIG. 4A, a block diagram of such an exemplary array 40 that contains identification cells 41A, 41B, 41C . . . 41N for identifying the tasks of various processors 10a, 10b, 10c . . . 10n for which respective contents of their registers are maintained for a particular time is shown. FIG. 4A shows values for identification cells 41A, 41B, 41C . . . 41N in array 40 after first processor 10a has executed the first task and when a task has not yet been executed by second processor 10b. FIG. 4A shows that identification cell 41A for first processor 10a contains a "First Task" value for indicating that the contents stored in the registers for first processor 10a are from executing the first task. FIG. 4A also shows that identification cell 41B for second processor 10b contains a "No Task" value for indicating that the contents of the registers for second processor 10b are from not having executed any task yet. Hypothetically, if identification cell 41B had a "First Task" value shown in FIG. 4A, method 30 in FIG. 3 would then proceed from decision block 32 directly to block 38. In exemplary method 30 of FIG. 3, the values in identification cells 41A and 41B are obtained from array 40 when determinations are made at decision blocks 32 and 35.

Figure 4B:
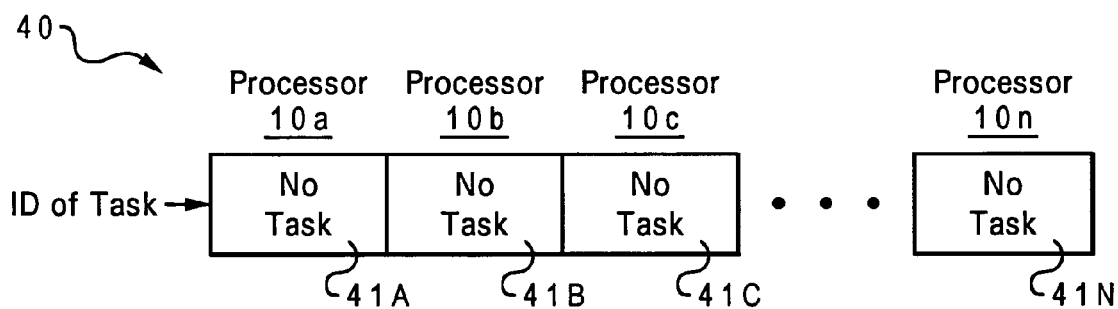
Figure 4C:
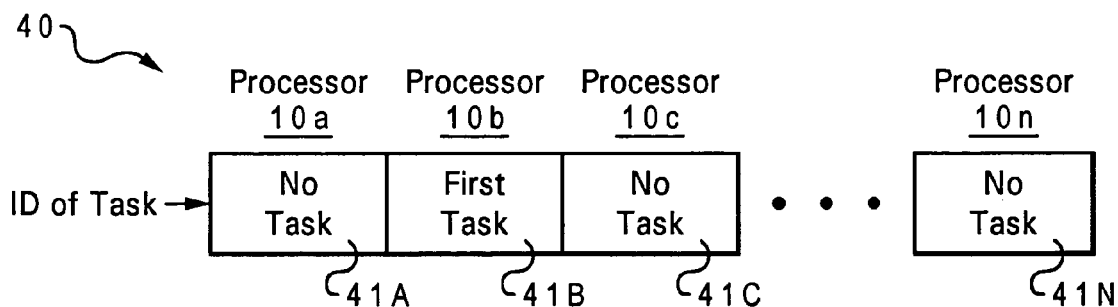

Referring back to FIG. 3, block 36 shows that the contents of the registers for first processor 10a are stored into memory system 16. First processor 10a is directed by second processor 10b through standard inter-processor communications to store the contents. The values in the registers of first processor 10a are no longer necessarily being maintained for the first task. Therefore, as shown in FIG. 4B, when the contents of these registers are stored into memory system 16, the value of identification cell 41A for processor 10a in array 40 is changed from the "First Task" value to a "No Task" value since the registers of first processor 10a are no longer necessarily being maintained for the first task and may have been modified by another task. Following block 36, block 37 shows that the contents of the registers from first processor 10a are loaded from memory system 16, and the registers of second processor 10b are set with the contents loaded from memory system 16. Method 30 then proceeds to block 38, which shows that the first task is executed in second processor 10b. After execution of the first task in processor 10b, array 40 is updated. FIG. 4C shows that identification cell 41B for second processor 10b in array 40 is changed from the "No Task" value to a "First Task" value since the registers of second processor at this time contain the values from having executed the first task. Method 30 finally ends at block 39.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of saving a state of a task and executing the task by a processor in a multiprocessor system having at least first and second processors, said method comprising:

following termination of execution of a first task in a first processor, said first processor having private internal registers providing low latency storage inaccessible to said second processor, maintaining at least a portion of a state of said first task in said private internal registers of said first processor until said first processor executes a second task;

thereafter, in response to said first processor executing a second task, selecting said second processor to execute said first task and prior to executing said first task on the second processor, determining if said state of said first task is at least partially stored in said private internal registers of said first processor;

in response to a determination that said state of said first task is at least partially stored in said private internal registers of said first processor, storing contents of said private internal registers in said first processor from said private internal registers into a shared memory system having higher latency than said private internal registers with respect to accesses by said first processor; and thereafter, executing said first task in said second processor.

2. The method according to claim 1 further comprising:

prior to executing said first task on said second processor and to determining if said state of said first task is at least partially stored in said private internal registers of said first processor, determining if said state of said first task is at least partially stored in private internal registers of said second processor; and in response to a determination that said state of said first task is at least partially stored in said private internal registers of said second processor, executing said first task in said second processor.

3. The method according to claim 2, wherein the determining steps further comprise:

maintaining an array of information in said memory system that identifies a task for each of the at least first and second processors for which their private internal registers are currently maintained;

comparing said first task with the task identified for each of the at least first and second processors stored in the array; and identifying the processors for which the task identified in the array is said first task.

4. The method according to claim 2, farther comprising:

preferentially selecting a task as said first task to be executed by said second processor based on whether the state of said first task is at least partially stored in said private internal registers of said second processor.

5. The method according to claim 1, further comprising:

prior to executing said first task in said second processor, loading the contents of said private internal registers of said first processor from the shared memory system into private internal registers of said second processor that are inaccessible to said first processor.

6. The method according to claim 1, further comprising:
including as part of said private internal registers of said first processor at least one exceptional register set; and
including as part of said private internal registers of said second processor at least another exceptional register set.

7. The method according to claim 6, further comprising:
including as part of said at least one exceptional register a floating point register set; and
including as part of said at least another exceptional register set another floating point register set.

8. The method according to claim 1, further comprising:
preferentially selecting a task as said first task to be executed by said second processor based on whether the state of said first task is at least partially stored in said private internal registers of said first processor.

9. A multiprocessor system having at least first and second processors for saving a state of a task and executing the task by a processor in the multiprocessor system, comprising:
at least first and second processors within the multiprocessor system, wherein each of the at least first and second processors has a respective set of private internal registers that provide low latency storage and that are inaccessible to other processors;
a shared memory system coupled to the at least first and second processors, wherein the shared memory system stores a task scheduler for scheduling tasks to be executed by processors among the at least first and second processors and wherein said shared memory system has higher access latency with respect to said first processor than said private internal registers;
wherein, following termination of execution of a first task in said first processor, the first processor maintains at least a portion of a state of said first task in said private internal registers of said first processor until said first processor executes a second task;
wherein, responsive to said first processor executing a second task, selecting said second processor to thereafter execute said first task and prior to execution of said first task on said second processor, the task scheduler determines if said state of said first task is at least partially stored in said private internal registers of said first processor;
wherein, in response to a determination that said state of said first task is at least partially stored in said private internal registers of said first processor, the task scheduler directs storing of contents of said private internal registers from said private internal registers of said first processor into the shared memory system; and
wherein, thereafter, the task scheduler directs said first task to be executed in said second processor.

10. The system according to claim 9, wherein:
prior to executing said first task on said second processor and to determining if said state of said first task is at least partially stored in said private internal registers of said first processor, the task scheduler determines if said state of said first task is at least partially stored in private internal registers of said second processor; and
in response to a determination that said state of said first task is at least partially stored in said private internal registers of said second processor, the task scheduler directs said first task to be executed in said second processor.

11. The system according to claim 10, wherein:
said memory system maintains an array of information that identifies a task for each of the at least first and second processors for which their private internal registers are currently maintained; and
the task scheduler determines if said state of said first task is at least partially stored in said private internal registers of said second processor by accessing the array and comparing an identifier of said first task with the task identified within said array for each of the at least first and second processors.

12. The system according to claim 9, wherein:
prior to executing said first task in said second processor, the task scheduler loads the contents of said private internal registers of said first processor from the memory system into said private internal registers of said second processor that are inaccessible to said first processor.

13. The system according to claim 9, wherein:
said private internal registers of said first processor comprise at least one exceptional register set; and
said private internal registers of said second processor comprise at least another exceptional register set.

14. The system according to claim 13, wherein:
said at least one exceptional register set is a floating point register set; and
said at least another exceptional register set is another floating point register set.

15. The system according to claim 9, wherein:
the task scheduler preferentially selects a task as said first task to be executed based on whether the state of said first task is at least partially stored in said private internal registers of said first processor.

16. The system according to claim 9, wherein:
the task scheduler preferentially selects a task as said first task to be executed based on whether the state of said first task is at least partially stored in said private internal registers of said second processor.

17. A program product for task management in a multiprocessor system having at least first and second processors, said program product comprising a computer storage media including:
means for causing said first processor, following termination of execution of a first task in said first processor, to maintain at least a portion of a state of said first task in low latency, private internal registers of said first processor until said first processor executes a second task, wherein said private internal registers of said first processor are inaccessible to said second processor;
means for determining, responsive to said first processor executing a second task and selection of the second processor to thereafter execute said first task and prior to executing said first task on the second processor, if said state of said first task is at least partially stored in said private internal registers of said first processor; and
means for causing said first processor to store contents of said private internal registers from said private internal registers into a higher latency shared memory system in response to a determination that said state of said first task is at least partially stored in said private internal registers of said first processor
means for thereafter causing said second processor to execute said first task.

18. The program product according to claim 17, further comprising:

means for determining if said state of said first task is at least partially stored in said private internal registers of said second processor prior to execution of said first task on said second processor; and means for causing said second processor to execute said first task in response to a determination that said state of said first task is at least partially stored in said private internal registers of said second processor.

19. The program product according to claim 18, wherein said means for determining further comprises:

means for maintaining an array of information in said shared memory system that identifies a task for each of the at least first and second processors for which their private internal registers are currently maintained; and means for comparing an identifier of said first task with the task identified in said array for each of the at least first and second processors.

20. The program product according to claim 18, further comprising:

means for preferentially selecting a task as said first task to be executed by said second processor based on whether the state of said first task is at least partially stored in said private internal registers of said second processor.

21. The program product according to claim 17, further comprising:

means for causing said second processor, prior to execution of said first task in said second processor, to load the contents of said private internal registers of said first processor from the shared memory system into private internal registers of said second processor that are inaccessible to said first processor.

22. The program product according to claim 17, further comprising:

means for preferentially selecting a task as said first task to be executed by said second processor based on whether the state of said first task is at least partially stored in said private internal registers of said first processor.

* * * * *